United States Patent
Morikawa et al.

(10) Patent No.: US 10,705,195 B2
(45) Date of Patent: Jul. 7, 2020

(54) DISTANCE MEASURING APPARATUS AND DISTANCE MEASURING METHOD

(71) Applicant: FUJITSU LIMITED, Kawasaki-shi, Kanagawa (JP)

(72) Inventors: Takeshi Morikawa, Yokohama (JP); Koichi Tezuka, Kobe (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

(21) Appl. No.: 15/707,466

(22) Filed: Sep. 18, 2017

(65) Prior Publication Data
US 2018/0106894 A1    Apr. 19, 2018

(30) Foreign Application Priority Data
Oct. 14, 2016    (JP) .................... 2016-202720

(51) Int. Cl.
*G01C 3/08* (2006.01)
*G01S 7/52* (2006.01)
(Continued)

(52) U.S. Cl.
CPC ........ *G01S 7/52077* (2013.01); *G01S 7/4817* (2013.01); *G01S 7/497* (2013.01);
(Continued)

(58) Field of Classification Search
CPC combination set(s) only.
See application file for complete search history.

(56) References Cited

U.S. PATENT DOCUMENTS 7,342,651 B1 *   3/2008  Woolfson ............... G01S 7/484
                                                          356/28
2002/0175859 A1 * 11/2002  Newberg ............. H01Q 3/2682
                                                          342/375
(Continued)

FOREIGN PATENT DOCUMENTS

JP    2005-221333      8/2005
JP    2006-308482     11/2006
(Continued)

OTHER PUBLICATIONS

Cimini ("Optical Phase Division Multiplexing for Local Communications Applications") (Year: 1989).*

*Primary Examiner* — Isam A Alsomiri
*Assistant Examiner* — Amir J Askarian
(74) *Attorney, Agent, or Firm* — Fujitsu Patent Center (57) ABSTRACT

A distance measuring apparatus measures a distance to a target from a plurality of directions, and includes sensors having identical two-dimensional scan type configurations that launch a laser beam and receive reflected light from the target by a multi-segment light receiving element, and a processor. The processor performs a process including specifying a receiving part of the multi-segment light receiving element of a first sensor, that receives a second laser beam launched from a second sensor in a state in which the target is non-detectable by the first sensor, adjusting a phase in a vertical scan direction of the second laser beam with respect to that of a first laser beam launched from the first sensor, until the receiving part no longer receives the second laser beam, and integrating range images from the first and second sensors after the phase is adjusted.

19 Claims, 9 Drawing Sheets

(51) Int. Cl.
  *G01S 17/87* (2020.01)
  *G01S 7/481* (2006.01)
  *G01S 17/10* (2020.01)
  *G01S 17/89* (2020.01)
  *G01S 17/42* (2006.01)
  *G01S 7/497* (2006.01)
  *G01S 7/523* (2006.01)
  *G01S 17/08* (2006.01)
  *G01S 17/66* (2006.01)

(52) U.S. Cl.
  CPC .............. *G01S 7/523* (2013.01); *G01S 17/08* (2013.01); *G01S 17/10* (2013.01); *G01S 17/42* (2013.01); *G01S 17/66* (2013.01); *G01S 17/87* (2013.01); *G01S 17/89* (2013.01)

(56) References Cited

U.S. PATENT DOCUMENTS

| | | | | |
|---|---|---|---|---|
| 2002/0196424 A1* | 12/2002 | Sano | ........................ | G01C 3/08 356/4.01 |
| 2003/0072051 A1* | 4/2003 | Myers | ................... | H04J 14/002 398/43 |
| 2003/0193981 A1* | 10/2003 | Matveev | .................... | G01S 7/51 372/69 |
| 2005/0057654 A1* | 3/2005 | Byren | ................... | G01S 17/895 348/169 |
| 2006/0227317 A1* | 10/2006 | Henderson | ........... | G01B 11/026 356/28 |
| 2006/0265147 A1 | 11/2006 | Yamaguchi et al. | | |
| 2007/0272841 A1* | 11/2007 | Wiklof | .................. | G01S 7/4817 250/234 |
| 2009/0091738 A1* | 4/2009 | Morcom | .................. | G01S 17/08 356/5.03 |
| 2009/0110033 A1* | 4/2009 | Shattil | .................. | H04B 1/7174 375/141 |
| 2010/0021179 A1* | 1/2010 | Kikuchi | ................. | H04B 10/61 398/183 |
| 2010/0321773 A1* | 12/2010 | Chen | .................. | G02B 21/0032 359/386 |
| 2011/0292498 A1* | 12/2011 | Chann | ................... | H01S 3/0057 359/341.1 |
| 2013/0016338 A1* | 1/2013 | Bridges | .............. | G01B 11/2527 356/51 |
| 2013/0314694 A1* | 11/2013 | Tchoryk, Jr. | ............ | G01S 17/95 356/28.5 |
| 2014/0062759 A1 | 3/2014 | Morikawa et al. | | |
| 2014/0376001 A1* | 12/2014 | Swanson | ................ | G01N 21/17 356/479 |
| 2016/0003946 A1* | 1/2016 | Gilliland | ................. | G01S 17/10 356/5.01 |
| 2016/0259059 A1* | 9/2016 | Mohseni | ................. | G01S 17/89 |
| 2017/0285146 A1* | 10/2017 | Iida | ........................ | G01S 7/4817 |
| 2017/0328989 A1* | 11/2017 | Bartlett | ................ | G01S 7/4814 |
| 2018/0038958 A1* | 2/2018 | Kawazoe | ................ | G01C 3/06 |
| 2018/0081041 A1* | 3/2018 | Niclass | ................. | G01B 11/22 |
| 2019/0064364 A1* | 2/2019 | Boysel | .................. | G01S 17/933 |
| 2019/0154439 A1* | 5/2019 | Binder | .................. | G01B 11/26 |

FOREIGN PATENT DOCUMENTS

| | | |
|---|---|---|
| JP | 2011-112503 | 6/2011 |
| JP | 2014-052274 | 3/2014 |

* cited by examiner

DISTANCE MEASURING APPARATUS AND DISTANCE MEASURING METHOD

CROSS-REFERENCE TO RELATED APPLICATIONS

This application is based upon and claims the benefit of priority of the prior Japanese Patent Application No. 2016-202720, filed on Oct. 14, 2016, the entire contents of which are incorporated herein by reference.

FIELD

The embodiments discussed herein are related to a distance (or range) measuring apparatus, a distance measuring method, and a computer-readable storage medium.

BACKGROUND

A scan type distance measuring apparatus has been proposed to measure a distance to a measurement target using a laser beam. This distance measuring apparatus has a launch unit that launches a laser beam (or laser pulses) emitted from a laser light source at a constant timing, for example, by using a MSMS (Micro Electro Mechanical System) mirror, for example, to scan the laser beam two-dimensionally. In addition, this distance measuring apparatus has a light receiving unit. With respect to the scan of the laser beam by the launch unit, a photodetector of the light receiving unit detects reflected light from the measurement object, and computes the distance to the measurement target for every scan position.

The distance measuring apparatus may be applied to detect various measurement targets including biometrics such as humans or the like, and objects such as vehicle or the like. The distance measuring apparatus may output a range image (or depth map) in which distance values at each of range (or distance) measurement points are arranged in an order of the raster scanned samples, for example. In this case, the distance measuring apparatus can detect an athlete, such as a gymnast, a basketball player, or the like, using the range image, and measure a form of the athlete, such as a form of a performance of the gymnast, a shooting form of the basketball player, or the like. The form or movement of the athlete can be analyzed based on the form of the athlete measured by the distance measuring apparatus. For example, in a case in which the form or movement of the gymnast is measured by the distance measuring apparatus, scoring or the like of the performance of the gymnast can be made based on the analyzed form or movement.

However, one distance measuring apparatus makes the measurement to the measurement target in one direction. It is not possible to measure the distance to a part of the measurement target not hit by the laser beam, such as a rear of the measurement target. Accordingly, a system has been proposed to make the measurement to the measurement target in a plurality of different directions, using a plurality of distance measuring apparatuses. However, in a case in which first and second distance measuring apparatuses are arranged at mutually opposing positions, for example, the first distance measuring apparatus may detect the laser beam launched from the second distance measuring apparatus. In this case, the first distance measuring apparatus erroneously detects the laser beam launched from the second distance measuring apparatus, as if the laser beam were the reflected light of the laser beam launched from the first distance measuring apparatus. Consequently, even if measured results of the first and second distance measuring apparatuses are integrated into a single measured result, it is difficult to accurately measure the movement or the like of the measurement target based on the single measured result.

The distance measuring apparatus may have a synchronization mechanism that scans the laser beam one-dimensionally using a rotation mechanism including a rotation mirror. This distance measuring apparatus receives the reflected light from the same direction in which the laser beam is launched. For this reason, Japanese Laid-Open Patent Publication No. 2011-112503 proposes adjusting a rotational speed of the rotation mirror of the first distance measuring apparatus when the rotation angle of the rotation mirror falls within an angular range in which the erroneous detection of the laser beam launched from the second distance measuring apparatus occurs. By adjusting the rotational speed of the rotation mirror of the first distance measuring apparatus in this manner, it is possible to prevent the first distance measuring apparatus from erroneously detecting the laser beam launched from the second distance measuring apparatus, as if the laser beam were the reflected light of the laser beam launched from the first distance measuring apparatus.

On the other hand, the distance measuring apparatus may have a separation structure to separate the launching light and the received light, that scans the laser beam two-dimensionally without using the rotation mechanism. In this case, a reception unit detects the scan range of the laser beam launched from the launch unit. For this reason, in a case in which the measurement target is measured from a plurality of different directions, the scan ranges of the laser beams launched from the plurality of distance measuring apparatuses interfere with each other. For example, there exists a timing at which the scan direction of the first distance measuring apparatus matches the scan direction of the second distance measuring apparatus that is arranged at a position opposing the first distance measuring apparatus. At this timing at which the scan direction of the first distance measuring apparatus matches the scan direction of the second distance measuring apparatus, the second distance measuring apparatus, for example, erroneously detects the laser beam launched from the first distance measuring apparatus, as if the laser beam were the reflected light of the laser beam launched from the second distance measuring apparatus. Accordingly, when using the plurality of distance measuring apparatus respectively having the separation structure to detect the scan range of the launched laser beam, it is difficult to prevent the distance measuring apparatus from erroneously detecting the laser beam launched from the opposing distance measuring apparatus, as if the laser beam were the reflected light of the laser beam launched therefrom.

Therefore, when conventionally using the plurality of distance measuring apparatus respectively having the structure to detect the scan range of the launched laser beam, and measuring the measurement target from the plurality of different directions, the scan ranges of the laser beams launched from the plurality of distance measuring apparatuses interfere with each other. For this reason, the distance measuring apparatus erroneously detects the laser beam launched from the opposing distance measuring apparatus, as if the laser beam were the reflected light of the laser beam launched therefrom.

Related art includes Japanese Laid-Open Patent Publications No. 2011-112503, No. 2014-052274, No. 2005-221333, and No. 2006-308482.

SUMMARY

Accordingly, it is an object in one aspect of the embodiments to provide a distance measuring apparatus, a distance measuring method, and a computer-readable storage medium, which can reduce an erroneous detection that is generated when scan ranges of laser beams launched from a plurality of distance measuring apparatuses interfere with each other.

According to one aspect of the embodiments, a distance measuring apparatus that measures a distance to a measurement target from a plurality of directions, includes first and second sensor units having identical two-dimensional scan type configurations that launch a laser beam emitted from a laser light source, and receive reflected light from the measurement target by a multi-segment light receiving element; and a processor configured to integrate range images from the first and second sensor units, wherein the processor performs a process including specifying at least one light receiving part of the multi-segment light receiving element of the first sensor unit, that receives the laser beam launched from the second sensor unit in a state in which the measurement target is non-detectable by the first sensor unit; adjusting a phase in a vertical scan direction of the laser beam launched from the second sensor unit with respect to a phase in the vertical scan direction of the laser beam launched from the first sensor unit, until the at least one light receiving part of the multi-segment light receiving element of the first sensor unit no longer receives the laser beam launched from the second sensor unit; and integrating the range images from the first and second sensor units after the phase in the vertical scan direction of the laser beam launched from the second sensor unit is adjusted.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of a distance measuring apparatus, a distance measuring method, and a computer-readable storage medium in each embodiment according to the present invention.

The disclosed distance measuring apparatus, distance measuring method, and computer-readable storage medium measure a distance to a measurement target from a plurality of directions. First and second sensor units having identical two-dimensional scan type configurations may launch a laser beam emitted from a laser light source, and receive reflected light from the measurement target by a multi-segment light receiving element. A processor may perform a process that includes specifying at least one light receiving part of the multi-segment light receiving element of the first sensor unit, that receives the laser beam launched from the second sensor unit in a state in which the measurement target is non-detectable by the first sensor unit, adjusting a phase in a vertical scan direction of the laser beam launched from the second sensor unit with respect to a phase in the vertical scan direction of the laser beam launched from the first sensor unit, until the at least one light receiving part of the multi-segment light receiving element of the first sensor unit no longer receives the laser beam launched from the second sensor unit, and integrating range images from the first and second sensor units after the phase in the vertical scan direction of the laser beam launched from the second sensor unit is adjusted.

Figure 1:
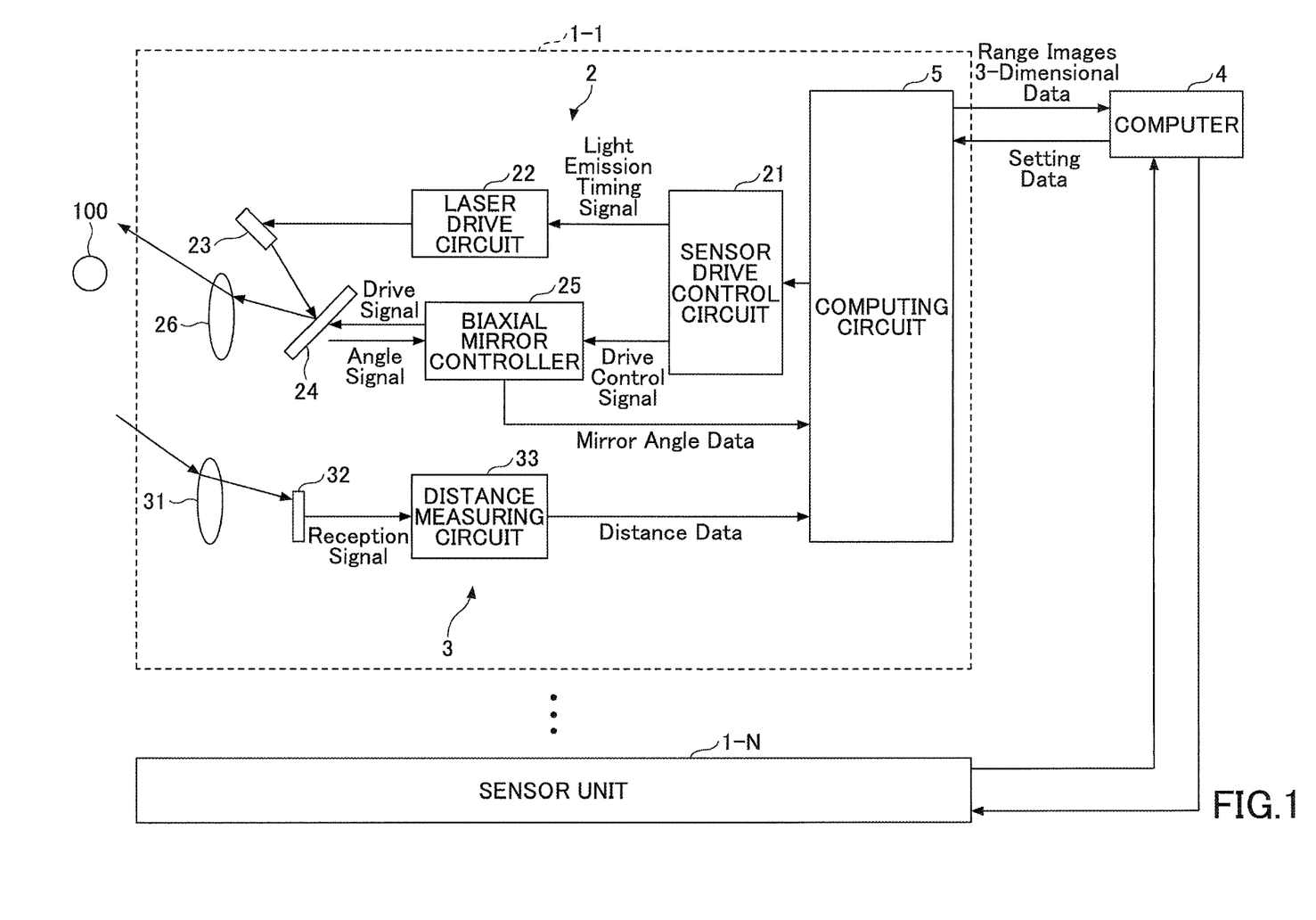
FIG. 1 is a diagram illustrating an example of a distance measuring apparatus in one embodiment.

FIG. 1 is a diagram illustrating an example of the distance measuring apparatus in one embodiment. The distance measuring apparatus illustrated in FIG. 1 includes a plurality of sensor units 1-1 to 1-N, where N is a natural number greater than or equal to 2, and a computer 4. The plurality of sensor units 1-1 to 1-N and the computer 4 may be connected via a network or the like, for example. In this case, the network may be a cable network, a wireless network, or a combination of cable and wireless networks. Each of the sensor units 1-1 to 1-N has the same configuration, including a launch unit 2, a reception unit 3, and a computing circuit 5. In other words, each of the sensor units 1-1 to 1-N is a hardware device, and is sometimes also simply referred to as a "sensor". Each of the launch unit 2 and the reception unit 3 is also a hardware device.

For example, in a case in which N=2, first and second sensor units 1-1 and 1-2 are provided at positions opposing each other via a measurement target 100, when measuring the measurement target 100. In addition, in a case in which N is an even number satisfying N>=4, the first and second sensor units 1-1 and 1-2 form a pair of sensor units opposing each other via the measurement target 100, when measuring the measurement target 100, and a plurality of such pairs of sensor units are provided. For example, when measuring the measurement target 100 in a case in which N=4, the first and second sensor units 1-1 and 1-2 are provided at positions opposing each other via the measurement target 100, and third and fourth sensor units 1-3 and 1-4 are provided at positions opposing each other via the measurement target 100. In this case, the first to fourth sensor units 1-1 to 1-4 may be provided at 90-degree angular intervals. A distance between the sensor units forming each pair is preferably constant from a viewpoint of simplifying a process of integrating range images (or depth maps) from the sensor units, however, the distance between the sensor units forming each pair may be different amongst the pairs.

The launch unit 2 includes a circuit (hereinafter referred to as a "sensor drive control circuit") 21 that controls driving of the sensor, a circuit (hereinafter referred to as a "laser drive circuit") 22 that drives a laser light source, a laser diode 23 that is an example of the laser light source, a biaxial scan mirror 24 formed by a two-dimensional MEMS (Micro Electro Mechanical System) mirror, a biaxial mirror controller 25, and a projection lens 26. The sensor drive control circuit 21 supplies to the laser drive circuit 22 a light emission timing signal that indicates a light emission timing of the laser diode 23. The laser drive circuit 22 drives the laser diode 23 to emit light at the light emission timing indicated by the light emission timing signal. In addition, the sensor drive control circuit 21 supplies to the mirror controller 25 a drive control signal for driving the scan mirror 24 along two axes. The mirror controller 25 outputs a drive signal that drives the scan mirror 24 along two axes, according to the drive control signal, and drives the scan mirror 24 by a known driver (not illustrated). A mirror angle of the scan mirror 24 is detected by a known detector (not illustrated) that supplies to the mirror controller 25 an angle signal that indicates the mirror angle. For the sake of convenience, FIG. 1 illustrates the scan mirror 24 as including the driver and the detector described above. The mirror controller 25 generates mirror angle data representing the mirror angle of the scan mirror 24, according to the angle signal, and supplies the mirror angle data to the computing circuit 5. Accordingly, a laser beam emitted from the laser diode 23 is deflected by the scan mirror 24, to perform a raster scan, for example, to scan a scan angle range via the projection lens 26. The laser beam makes the raster scan in a horizontal scan direction and a vertical scan direction, to perform a scan in units of frames. The projection lens 26 may include a magnifying lens.

By performing the raster scan described above, the laser beam (or laser pulses) scans a measurement range at a position that is separated by a predetermined distance from the sensor unit 1-$i$, where i=1, . . . , N. This measurement range, at the position separated by the predetermined distance from the sensor unit 1-$i$, has a width corresponding to a distance the laser beam moves from one end to the other end of the scan angle range approximately parallel to a horizontal plane (or ground), for example, and has a height corresponding to a distance the laser beam moves from a lowermost point to an uppermost point of the scan angle range in a direction vertical to the horizontal plane. In other words, the measurement range refers to an entire region scanned by the laser beam at a position separated by the predetermined distance from the sensor unit 1-$i$.

In this example, the sensor units 1-1 to 1-N are synchronized, so that the horizontal scan direction and the vertical scan direction of the laser beam match amongst each of the sensor units 1-1 to 1-N. In addition, pulse intervals of the laser beam are set to be the same for each of the sensor units 1-1 to 1-N. Furthermore, a phase of the laser beam in the vertical scan direction of each of the sensor units 1-1 to 1-N is adjustable based on setting data input from the computer 4 to each of the sensor units 1-1 to 1-N.

The reception unit includes a reception lens 31, a photodetector 32, and a distance measuring circuit 33. The reflected light from the measurement target 100 is detected by the photodetector 32 via the reception lens 31. The photodetector 32 is formed by a multi-segment light receiving element, and supplies to the distance measuring circuit 33 a reception signal representing the reflected light that is detected. In a case in which the multi-segment light receiving element is segmented into 9 segments, the multi-segment light receiving element outputs a reception signal representing the reflected light that is detected by each of the 9 light receiving part (or light receiving regions). Accordingly, as will be described later, by selecting the reception signals output from the 9 light receiving parts, it is possible to process the reception signals output from the light receiving parts that are limited to within a region in which a directivity is secured. The distance measuring circuit 33 measures a TOF (Time Of Flight) $\Delta T$ of the laser beam that is launched from the launch unit 2, reflected by the measurement target 100, and returned and received by the reception unit 3. The distance measuring circuit 33 measures the distance to the measurement target 100 based on the TOF $\Delta T$, and supplies to the computing circuit 5 distance data indicating the measured distance. When a velocity c of light is regarded to be approximately 300,000 km/s, the distance to the measurement target 100 can be obtained from $(c \times \Delta T)/2$, for example.

Figure 2:
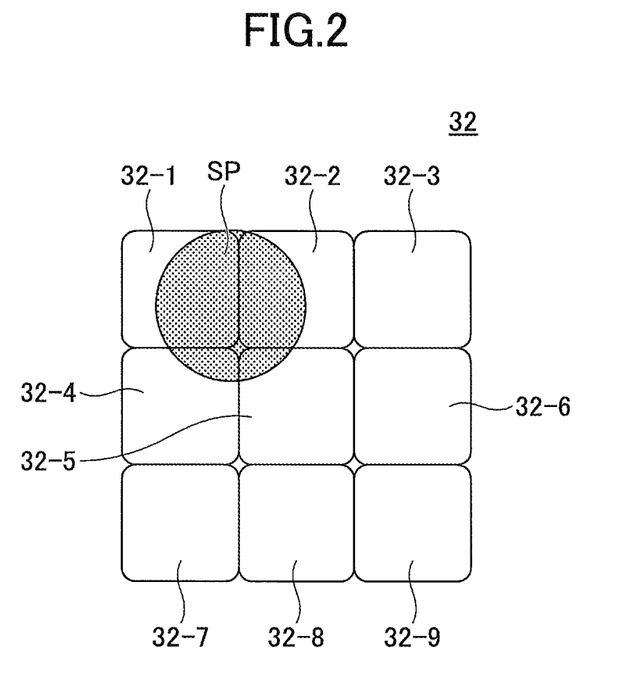
FIG. 2 is a front view schematically illustrating an example of light receiving parts of a photodetector.

FIG. 2 is a front view schematically illustrating an example of the light receiving parts of the photodetector. In the example illustrated in FIG. 2, the multi-segment light receiving element of the photodetector 32 is segmented into 9 light receiving parts. Hence, the photodetector 32 includes 9 light receiving parts 32-1 to 32-9 arranged in a matrix arrangement. The reception lens 31 receives the reflected light from the measurement target 100, and forms a beam spot SP having a specific size on at least one of the light receiving parts 32-1 to 32-9. Hence, the reception lens 31 may include a condenser lens. In this example, each of the light receiving parts 32-1 to 32-9 has an approximately rectangular shape having the same size, and the beam spot SP indicated by half-tone in FIG. 2 has an approximately circular shape. The size (that is, area) of the beam spot SP is greater than the size (that is, area) of each of the light receiving parts 32-1 to 32-9. Of course, the number segments into which the multi-segment light receiving element is segmented is not limited to 9.

In the sensor unit 1-1, for example, at least one light receiving part of the multi-segment light receiving element thereof, that receives the laser beam launched from the other sensor unit 1-2, for example, in a state in which the measurement target 100 is non-detectable by the sensor unit 1-1, is specified. The measurement target 100 is non-detectable by the sensor unit 1-1 (or the sensor unit 1-2) when the measurement target 100 is outside the measurement range of the sensor unit 1-1 (or the sensor unit 1-2), or when the measurement target 100 is non-existent. Hence, when measuring the measurement target 100, it is possible to exclude the at least one light receiving part that is specified, and select the reception signals output from the light receiving parts that are limited to within the region in which the directivity is secured. As a result, the sensor unit 1-1 can launch the laser beam to measure the measurement target 100, and receive the reflected light from the measurement target 100, to measure the distance to the measurement target based on the reception signals from the selected light receiving parts. Hence, it is possible to judge that the laser beam received by the at least one light receiving part other than the light receiving parts that are limited to within the region in which the directivity is secured, is not the reflected light from the measurement target 100 that is received when the sensor unit 1-1 launches the laser beam towards the measurement target 100. In other words, it is possible to judge that the laser beam received by the at least one light receiving part other than the light receiving parts that are limited to within the region in which the directivity is secured, is the laser beam launched from another sensor unit, such as the sensor unit 1-2.

Figure 3:
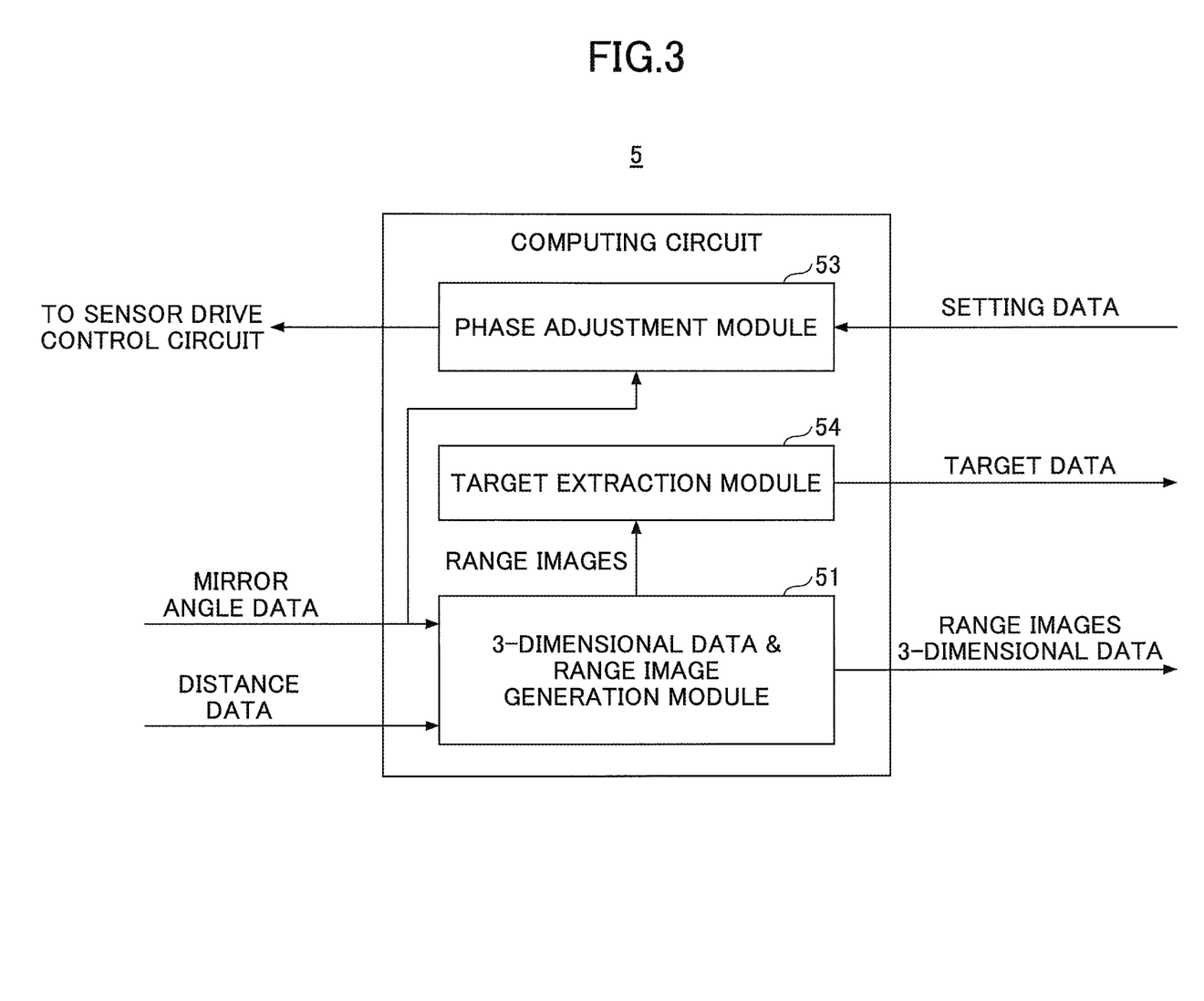
FIG. 3 is a functional block diagram illustrating an example of a computing circuit.

FIG. 3 is a functional block diagram illustrating an example of the computing circuit. The computing circuit 5 may be formed by a processor, for example. The processor may execute one or more programs stored in a memory, to perform functions of each of modules 51, 53, and 54 illustrated in FIG. 3. In this example, the computing circuit 5 includes a module (hereinafter referred to as a "three-dimensional data and range image generation module") 51 that generates three-dimensional data and the range images, a phase adjustment module 53, and a target extraction module 54.

The three-dimensional data and range image generation module 51 is an example of a range image generating means for inputting mirror angle data and distance data, and generating the range images from the distance data and generating the three-dimensional data from the range images and the mirror angle data. In addition, the three-dimensional data and range image generation module 51 also generates launch angle data indicating a launch angle of the laser beam, from the mirror angle data. The range image (or depth map) is an image in which distance values at each of range (or distance) measurement points are arranged in an order of the raster scanned samples, for example. The range images may be output to the computer 4. The three-dimensional data may be generated by a conversion using the distance values and the launch angle data. The three-dimensional data may be output to the computer 4.

The target extraction module 54 is an example of a target extracting means for extracting the measurement target 100 from the range images, in a case in which the measurement target 100 exists within the scan angle range of the raster scan. A method of extracting the measurement target 100 from the range images is not limited to a particular method, and the measurement target 100 may be extracted by a known method. For example, in a case in which the measurement target 100 is a human, the measurement target 100 can be extracted by detecting, from the range images, shapes of body postures the human is likely to take or the shapes of body postures the human can take. As another example of specifying the target, the acquired range image or a three-dimensional image may be displayed on a display device of the computer 4, for example, and the measurement target 100 may be extracted by specifying (clicking) a desired position or range on a display screen using a mouse or the like. The target extraction module 54 may output the data (hereinafter also referred to as "target data") of the extracted measurement target 100 to the computer 4.

For example, a case will be considered in which the sensor units 1-1 and 1-2 form a pair of mutually opposing sensor units. In this case, the computer 4 specifies the at least one light receiving part of the multi-segment light receiving element forming the photodetector 32 of the sensor unit 1-1 that receives the laser beam launched from the opposing sensor unit 1-2 in the state in which the measurement target 100 is non-detectable by the sensor unit 1-1. The computer 4 inputs to the sensor unit 1-1 the setting data including the at least one light receiving part that is specified. Hence, the phase adjustment module 53 of the sensor unit 1-2 inputs the mirror angle data, and controls the sensor drive control circuit 21 based on the setting data from the computer 4, to adjust a phase in a vertical scan direction of the laser beam launched from the sensor unit 1-2 with respect to a phase in the vertical scan direction of the laser beam launched from the sensor unit 1-1, until the at least one light receiving part of the multi-segment light receiving element of the sensor unit 1-1 no longer receives the laser beam launched from the sensor unit 1-2.

Accordingly, based on the setting data from the computer 4, the computing circuit 5 adjusts the phase in the vertical scan direction of the laser beam launched from the sensor unit (for example, the sensor unit 1-2) to which this computing circuit 5 belongs, with respect to the phase in the vertical scan direction of the laser beam launched from a reference sensor unit (for example, the sensor unit 1-1), and delays a scan start point with respect to a scan start point of the reference sensor unit.

Figure 4:
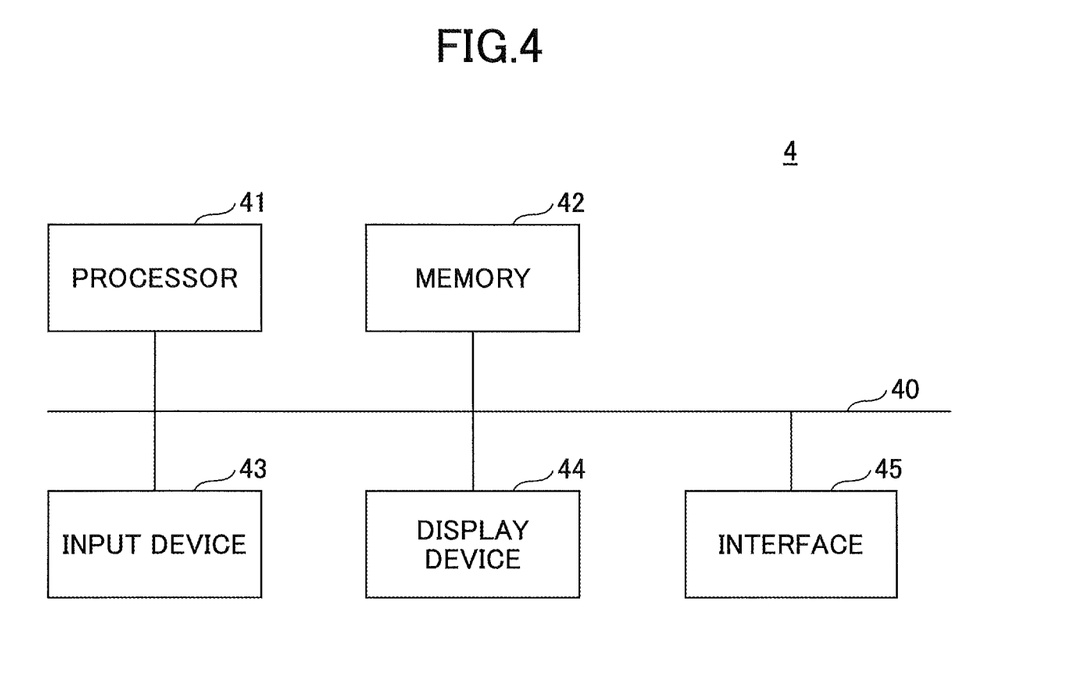
FIG. 4 is a block diagram illustrating an example of a computer.

The computer 4 may have a configuration illustrated in FIG. 4, for example. FIG. 4 is a block diagram illustrating an example of the computer. The computer 4 illustrated in FIG. 4 includes a processor 41, a memory 42, an input device 43, a display device 44, and an interface (or communication device) 45 that are mutually connected via a bus 40. The processor 41 may be formed by a CPU (Central Processing Unit) or the like, for example. The processor 41 executes one or more programs stored in the memory 42, and controls the entire computer 4. The memory 42 may be formed by a computer-readable storage medium, such as a semiconductor memory device, a magnetic recording medium, an optical recording medium, a magneto-optic recording medium, or the like. The memory 42 stores various programs including a distance measuring program executed by the processor 41, various data, or the like. The memory 42 may be formed by a non-transitory computer-readable storage medium that stores at least one program to be executed by the processor 41.

The input device 43 may be formed by a keyboard or the like that is operated by a user (or operator) to input commands and data to the processor 41. The display device 44 may display messages, measured results of the distance measuring process, such as the range images, or the like with respect to the user. The interface 45 may communicably connect the computer 4 to another computer or the like. In this example, the computer 4 is connected to the computing circuit 5 via the interface 45.

The computer 4 (that is, the processor 41 and the memory 42) is an example of an integrating means for integrating the range images from the sensor units 1-1 and 1-2 after the phase in the vertical scan direction of the laser beam launched from the sensor unit 1-2 is adjusted. For example, in a case in which the computer 4 is connected to the sensor units 1-1 and 1-2 forming the mutually opposing pair of sensor units, the computer 4 specifies the at least one light receiving part of the multi-segment light receiving element forming the photodetector 32 of the sensor unit 1-1 that receives the laser beam launched from the opposing sensor unit 1-2 in the state in which the measurement target 100 is non-detectable by the sensor unit 1-1. In addition, the computer 4 adjusts the phase in the vertical scan direction of the laser beam launched from the sensor unit 1-2 with respect to the phase in the vertical scan direction of the laser beam launched from the sensor unit 1-1, until the at least one light receiving part of the multi-segment light receiving element of the sensor unit 1-1 no longer receives the laser beam launched from the sensor unit 1-2. Further, the computer 4 integrates the range images from the sensor units 1-1 and 1-2 after the phase in the vertical scan direction of the laser beam launched from the sensor unit 1-2 is adjusted.

The computer 4 is not limited to a hardware configuration in which constituent elements of the computer 4 are connected via the bus 40 as illustrated in FIG. 4. The computer 4 may be formed by a general-purpose computer, for example. In addition, the computer 4 may be provided with a dedicated processor exclusively for graphics, and the range images and the three-dimensional data may be processed by this dedicated processor. In this case, processes other than the graphic process, such as control processes or the like, may be performed by the processor 41. The dedicated processor may be connected directly to the display device 44, for example.

The input device 43 and the display device 44 of the computer 4 may be omitted. In addition, in a case in which a module, a semiconductor chip, or the like has the computer 4 in which the interface 45 is further omitted in addition to the input device 43 and the display device 44, outputs of each of the sensor units 1-1 to 1-N (that is, the output of each computing circuit 5) may be connected to the bus 40, or may be connected directly to the processor 41. For example, in a case in which the computer 4 is formed by a semiconductor chip or the like, the semiconductor chip or the like may be provided within each of the sensor units 1-1 to 1-N. The computer 4 may include at least a part of the computing circuit 5, for example.

First Embodiment

Figure 5:
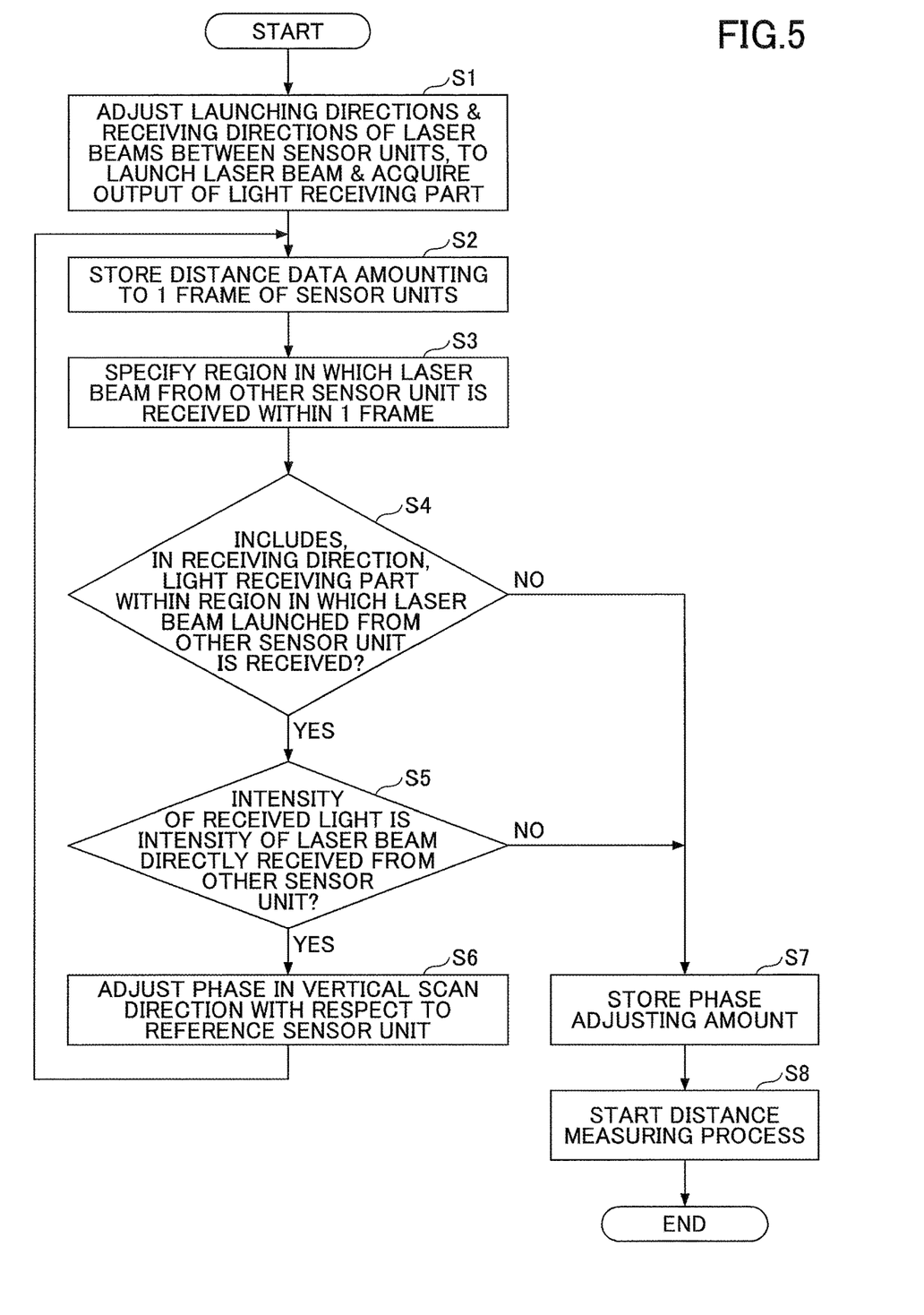
FIG. 5 is a flow chart for explaining an example of a distance measuring process in a first embodiment.

FIG. 5 is a flow chart for explaining an example of the distance measuring process in a first embodiment. For example, the processor 41 of the computer 4 illustrated in FIG. 4 may execute a program stored in the memory 42, to perform the distance measuring process illustrated in FIG. 5. For the sake of convenience, a description will be given of a case in which N=2 in this example. In step S1 illustrated in FIG. 5, the processor 41 adjusts launching directions and receiving directions of the laser beams between the sensor units 1-1 and 1-2 that are provided at the positions opposing each other, to launch the laser beam from the launch unit 2 and receive the light by the reception unit 3. More particularly, the processor 41 inputs the setting data to the mutually opposing sensor units 1-1 and 1-2 in a state in which the measurement target 100 is non-detectable by the sensor units 1-1 and 1-2. The non-detectable state of the measurement target 100 may be judged from the target data input from the computing circuits 5 of the sensor units 1-1 and 1-2. Hence, the launching direction and the receiving direction of the laser beams between the sensor units 1-1 and 1-2 are adjusted, to launch the laser beam via the computing circuit 5, the sensor drive control circuit 21, and the mirror controller 25, and to receive the light by corresponding light receiving parts of the 9-segment light receiving element forming the photodetector 32, so that the distance data is acquired via the distance measuring circuit 33 and the computing circuit 5. In step S2, the processor 41 stores, in the memory 42, the distance data amounting to one frame of the sensor units 1-1 and 1-2. In step S3, the processor 41 specifies the region in which the reference sensor unit receives the laser beam from the sensor unit other than the reference sensor within one frame. For example, in the case in which the sensor unit 1-1 is the reference sensor unit, the processor 41 specifies the region in which the sensor unit 1-1 receives the laser beam from the other sensor unit (in this example, the sensor unit 1-2) within one frame, based on the distance data amounting to one frame stored in the memory 42.

Figure 6:
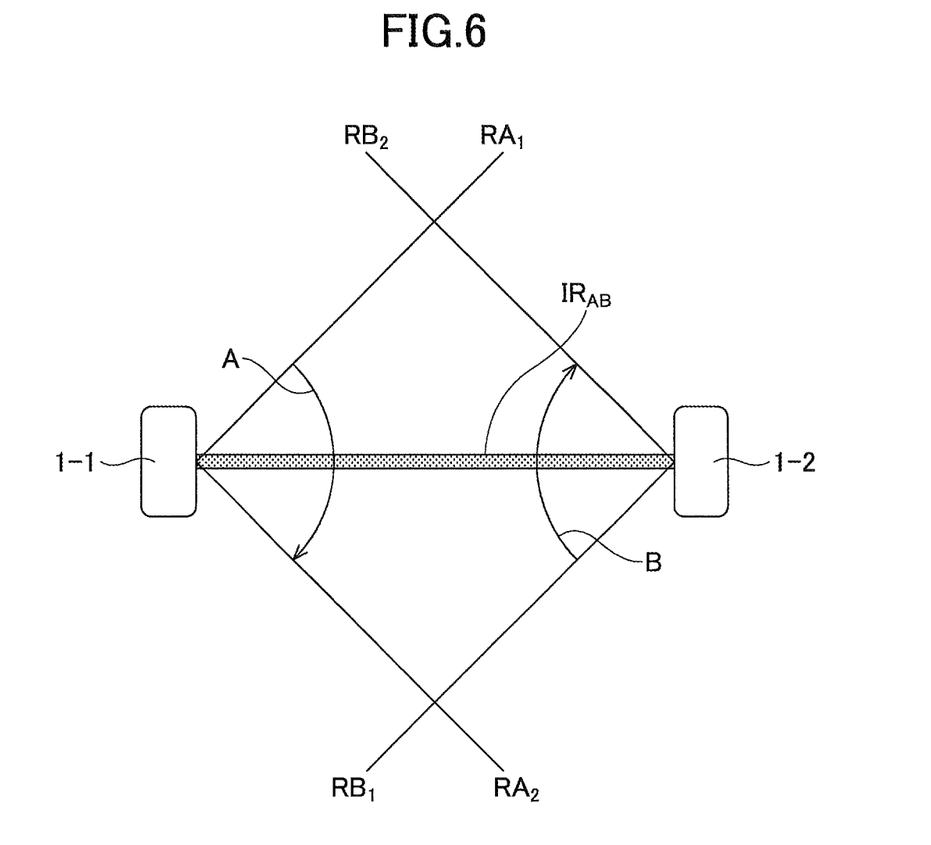
FIG. 6 is a plan view schematically illustrating an example of a relationship between an arrangement of sensor units and scan ranges of laser beams in the first embodiment.

FIG. 6 is a plan view schematically illustrating an example of a relationship between an arrangement of the sensor units and the scan ranges of laser beams in the first embodiment. In FIG. 6, the sensor units 1-1 and 1-2 are provided at the positions opposing each other. The sensor unit 1-1 scans and receives the laser beam in the scan direction and the receiving direction, respectively, as indicated by an arrow A. On the other hand, the sensor unit 1-2 scans and receives the laser beam in the scan direction and the receiving direction, respectively, as indicated by an arrow B. In addition, a scan range $R_{A1}$-$R_{A2}$ of the laser beam launched from the sensor unit 1-1 and a scan range $R_{B1}$-$R_{B2}$ of the laser beam launched from the sensor unit 1-2 mutually interfere in an interference region $IR_{AB}$ indicated by halftone.

In step S4, the processor 41 judges whether the 9-segment light receiving element forming the photodetector 32 of the reference sensor unit (in this example, the sensor unit 1-1) includes, in the receiving direction, a light receiving part within the region in which the laser beam launched from the sensor unit (in this example, the sensor unit 1-2) other than the reference sensor unit is received. The process advances to step S5 when the judgement result in step S3 is YES. On the other hand, the process advances to step S7 which will be described later when the judgment result in step S3 is NO.

In step S5, the processor 41 judges whether an intensity of the laser beam received by the light receiving part within the region in which the laser beam launched from the sensor unit (in this example, the sensor unit 1-2) other than the reference sensor unit (in this example, the sensor unit 1-1) is received, amongst the 9-segment light receiving element forming the photodetector 32 of the reference sensor unit, is an intensity of the laser beam that is launched by the sensor unit other than the reference sensor unit and is directly received. When the judgment result in step S5 is NO, it is judged that the received light is the reflected light of the laser beam launched from the reference sensor unit, and the process advances to step S7.

When the judgment result in step S5 is YES, the process advances to step S6. In step S6, the processor 41 adjusts the phase in the vertical scan direction of the laser beam launched from the sensor unit (in this example, the sensor unit 1-2) other than the reference sensor unit (in this example, the sensor unit 1-1), with respect to the phase in the vertical scan direction of the laser beam launched from the reference sensor unit, and the process returns to step S2.

Processes of steps S2 to S6 are repeated until the 9-segment light receiving element forming the photodetector 32 of the reference sensor unit no longer directly receives the laser beam launched from the sensor unit other than the reference sensor unit.

Figure 7:
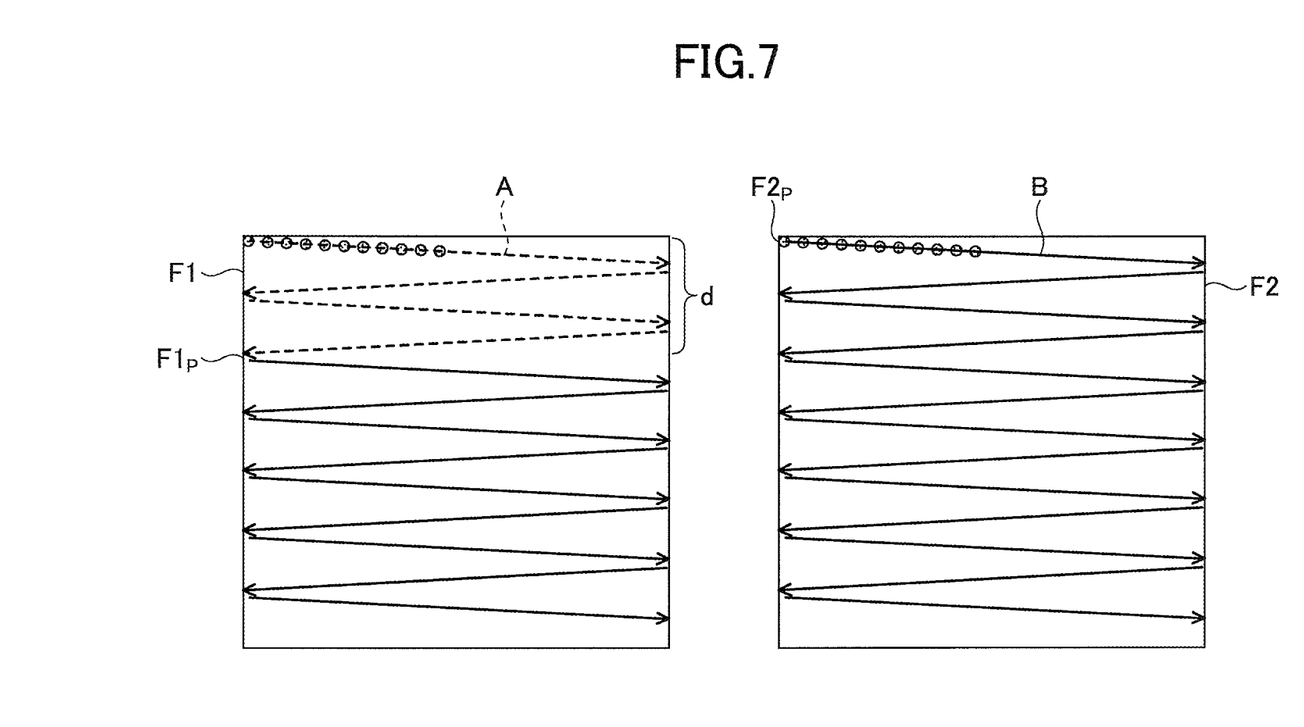
FIG. 7 is a diagram for explaining an example of a raster scan within one frame.

FIG. 7 is a diagram for explaining an example of the raster scan within one frame. In FIG. 7, A schematically illustrates the scan direction and the receiving direction of the sensor 1-1, B schematically illustrates the scan direction and the receiving direction of the sensor 1-2, and a circular mark "o" schematically illustrates the sampling point. Further, F1 indicates one frame in which the laser beam launched from the sensor unit 1-1 makes the raster scan in the horizontal scan direction and the vertical scan direction, and F2 indicates one frame in which the laser beam launched from the sensor unit 1-2 makes the raster scan in the horizontal scan direction and the vertical scan direction. In the example illustrated in FIG. 7, the sensor unit 1-1 performs the scan to a position F1$p$, and the sensor 1-2 starts to scan from a position F2$p$ at a timing when the scan of the sensor unit 1-1 continues from the position F1$p$. In this example, the phase in the vertical scan direction of the laser beam launched from the sensor unit other than the reference sensor unit is adjusted to be delayed with respect to the phase in the vertical scan direction of the laser beam launched from the reference sensor unit, by an adjusting amount d indicated by a dotted line within the frame F1 in FIG. 7. This adjusting amount d is ½ a maximum vertical scan period or less within one frame, for example.

In step S7, the processor 41 stores, in the memory 42, the adjusting amount (hereinafter also referred to as the "phase adjusting amount d") of the phase in the vertical scan direction of the laser beam. In step S8, the processor 41 sets the setting data, including the stored phase adjusting amount d, to each of the sensor units 1-1 and 1-2, to start the distance measuring process. Further, the processor 41 integrates the range images from each of the sensor units 1-1 and 1-2, and the process ends. The non-detectable state of the measurement target 100 may be judged from the target data input from the computing circuits 5 of the sensor units 1-1 and 1-2. In step S8, the processor 41 may start the distance measuring process and integrate the three-dimensional data from each of the sensor units 1-1 and 1-2. Of course, in step S8, the process 41 may start the distance measuring process, and integrate the range images from each of the sensor units 1-1 and 1-2, and also integrate the three-dimensional data from each of the sensor units 1-1 and 1-2.

According to this embodiment, the distance to the measurement target is measured from a plurality of directions, and the scan start points are shifted amongst the sensor units, so that each sensor unit does not receive the laser beam from other sensor units. More particularly, with respect to scan start point of the reference sensor unit, the scan start point of the other sensor units is delayed. Hence, each sensor unit does not receive light other than the reflected light from the measurement target that is hit by the laser beam launched from each sensor unit. In other words, each sensor unit does not receive the laser beam launched from other sensor units. As a result, it is possible to reduce an erroneous detection that is generated when the scan ranges of the laser beams launched from the plurality of sensor units interfere with each other.

Second Embodiment

An example of the distance measuring process in a second embodiment may be similar to the distance measuring process illustrated in FIG. 5, however, N=4, for example, in this second embodiment. For this reason, this second embodiment may perform the distance measuring process illustrated in FIG. 5 for each pair of mutually opposing sensor units.

Figure 8:
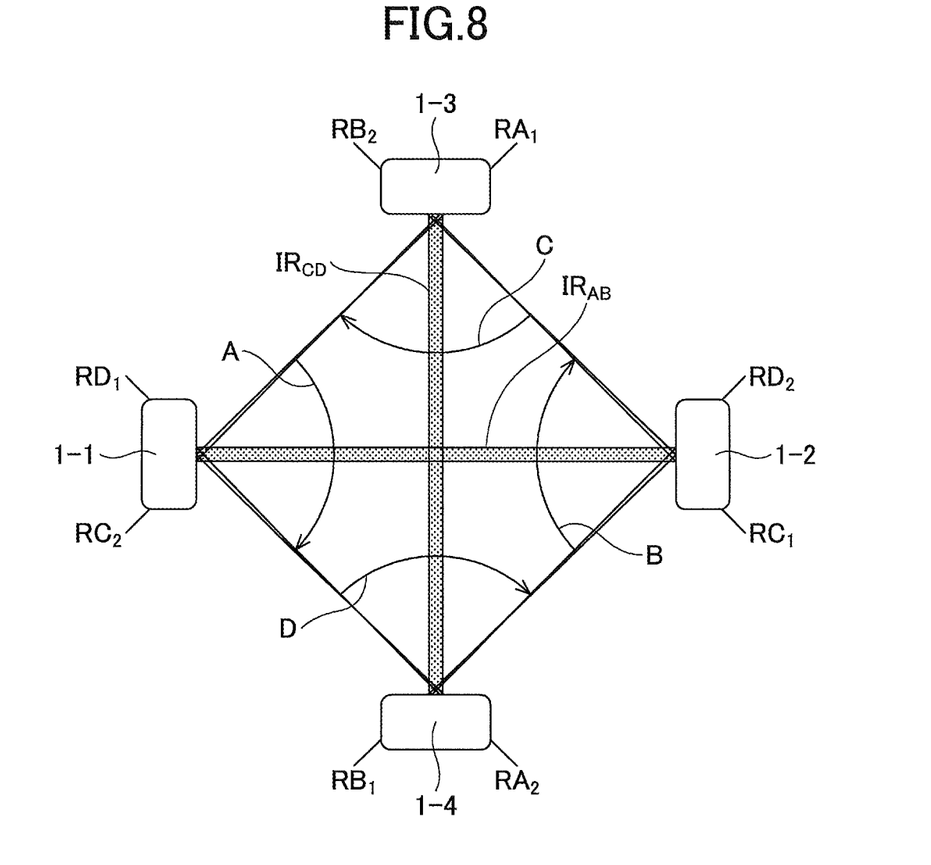
FIG. 8 is a plan view schematically illustrating an example of the relationship between the arrangement of the sensor units and the scan ranges of the laser beams in a second embodiment.

FIG. 8 is a plan view schematically illustrating an example of the relationship between the arrangement of the sensor units and the scan ranges of the laser beams in the second embodiment. In FIG. 8, those parts that are the same as those corresponding parts in FIG. 6 are designated by the same reference numerals, and a description thereof will be omitted. In FIG. 8, the sensor units 1-1 and 1-2 are provided at positions opposing each other, and the sensor units 1-3 and 1-4 are provided at positions opposing each other. In other words, a pair of mutually opposing sensor units is provided at a plurality of locations. In this example, the sensor units 1-1 to 1-4 are provided at 90-degree angular intervals, however, the angular intervals are not limited to 90 degrees. The sensor unit 1-3 scans and receives the laser beam in the scan direction and the receiving direction, respectively, as indicated by an arrow C. On the other hand, the sensor unit 1-4 scans and receives the laser beam in the scan direction and the receiving direction, respectively, as indicated by an arrow D. In addition, a scan range $R_{C1}$-$R_{C2}$ of the laser beam launched from the sensor unit 1-3 and a scan range $R_{D1}$-$R_{D2}$ of the laser beam launched from the sensor unit 1-4 mutually interfere in an interference region $IR_{CD}$ indicated by halftone. Both the scan range $R_{C1}$-$R_{C2}$ of the laser beam launched from the sensor unit 1-3 and the scan range $R_{D1}$-$R_{D2}$ of the laser beam launched from the sensor unit 1-4 do not interfere with the scan range $R_{A1}$-$R_{A2}$ of the laser beam launched from the sensor unit 1-1 nor the scan range $R_{B1}$-$R_{B2}$ of the laser beam launched from the sensor unit 1-2.

In a case in which the scan ranges of the laser beams launched from four or more sensor units mutually interfere, the phase in the vertical scan direction of the laser beam launched from one of the sensor units other than the reference sensor unit may be delayed with respect to the phase in the vertical scan direction of the laser beam launched from the reference sensor unit, and a further delay may be successively added to the phase in the vertical scan direction of the laser beam launched from each of the remaining sensor units other than the reference sensor unit, with respect to the phase in the vertical scan direction of the laser beam launched from the one of the sensor units other than the reference sensor unit.

Figure 9:
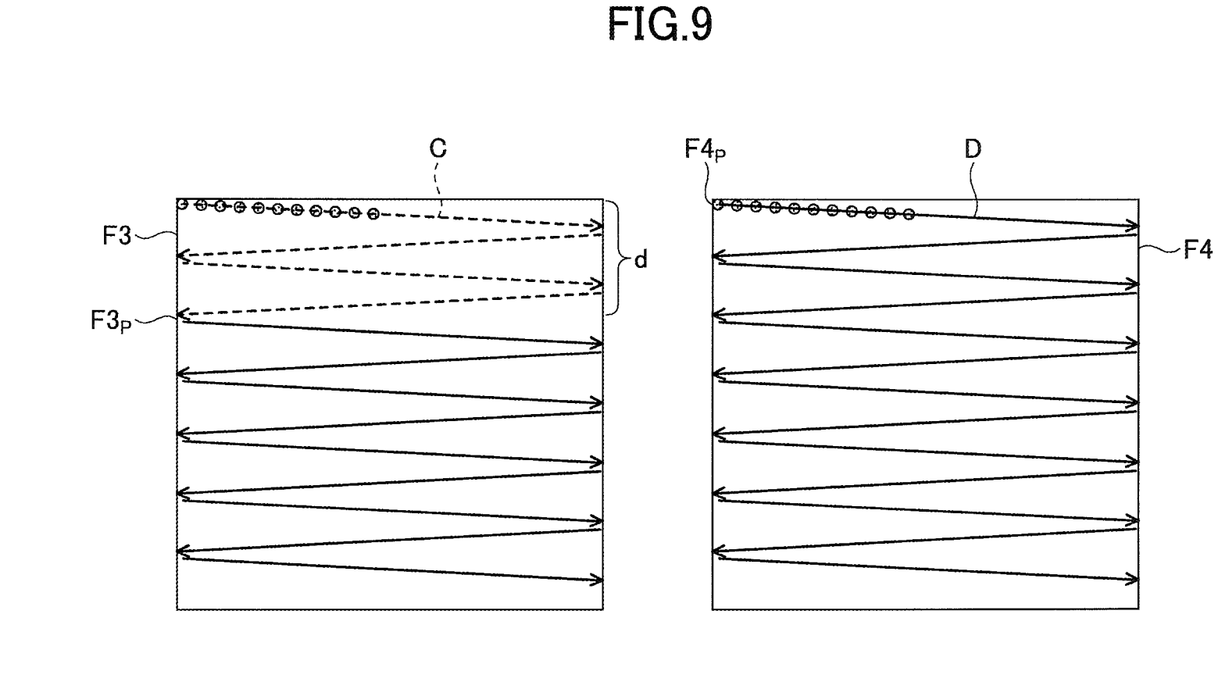
FIG. 9 is a diagram for explaining an example of the raster scan within one frame.

FIG. 9 is a diagram for explaining an example of the raster scan within one frame. In FIG. 9, C schematically illustrates the scan direction and the receiving direction of the sensor 1-3, D schematically illustrates the scan direction and the receiving direction of the sensor 1-4, and a circular mark "o" schematically illustrates the sampling point. Further, F3 indicates one frame in which the laser beam launched from the sensor unit 1-3 makes the raster scan in the horizontal scan direction and the vertical scan direction, and F4 indicates one frame in which the laser beam launched from the sensor unit 1-4 makes the raster scan in the horizontal scan direction and the vertical scan direction. One frame in which the laser beam launched from each of the sensor units 1-1 and 1-2 makes the raster scan in the horizontal scan direction and the vertical scan direction is the same as that illustrated in FIG. 7. In the example illustrated in FIG. 9, the sensor unit 1-3 performs the scan to a position F3p, and the sensor 1-4 starts to scan from a position F4p at a timing when the scan of the sensor unit 1-3 continues from the position F3p. In this example, the phase in the vertical scan direction of the laser beam launched from the sensor unit (in this example, the sensor unit 1-4) other than the reference sensor unit (in this example, the sensor unit 1-3) is adjusted to be delayed with respect to the phase in the vertical scan direction of the laser beam launched from the reference sensor unit, by an adjusting amount d indicated by a dotted line within the frame F3 in FIG. 9. This adjusting amount d is ½ the maximum vertical scan period or less within one frame, for example. In this case, the adjusting amount d within the frame F3 illustrated in FIG. 9 may be the same as, or may be different from, the adjusting amount d within the frame F1 illustrated in FIG. 7.

According to this embodiment, the distance to the measurement target is measured from a plurality of directions, and the scan start points are shifted amongst the sensor units, so that each sensor unit does not receive the laser beam from other sensor units. More particularly, with respect to scan start point of the reference sensor unit, the scan start point of the other sensor units is delayed. Hence, each sensor unit does not receive light other than the reflected light from the measurement target that is hit by the laser beam launched from each sensor unit. In other words, each sensor unit does not receive the laser beam launched from other sensor units. As a result, it is possible to reduce an erroneous detection that is generated when the scan ranges of the laser beams launched from the plurality of sensor units interfere with each other.

In each of the embodiments described above, between two mutually opposing sensor units, the phase in the vertical scan direction of the laser beam launched from one sensor unit is adjusted to be delayed by the adjusting amount with respect to the phase in the vertical scan direction of the laser beam launched from the other sensor unit. For this reason, the scan start point (or time) is shifted between the two mutually opposing sensor units. However, by setting the shift (or adjusting amount) to ½ the maximum vertical scan period or less within one frame (that is, ½ the maximum vertical scan period at the maximum), it is possible to minimize undesirable effects on the distance measuring accuracy. The adjusting (or delaying) amount of the phase in the vertical scan direction of the laser beam may be determined by taking into consideration the effects or the like of the interference between the laser beams launched from the mutually opposing sensor units, the delay of the scan start point of one sensor unit with respect to the other sensor unit, or the like.

Originally, when synchronizing a plurality of sensor units, it is preferable to match the launch timings of the laser beams. However, the two-dimensional MEMS mirrors or the like have individual differences, and it is difficult to perfectly match the launch timings of the laser beams amongst the plurality of sensor units. On the other hand, in each of the embodiments described above, the phase in the vertical scan direction of the laser beam launched from other sensor units is delay by the adjusting amount, with respect to the phase in the vertical scan direction of the laser beam launched from the reference sensor unit. Consequently, it is unnecessary to perfectly match the launch timings of the laser beams amongst the plurality of sensor units.

Further, the mutually opposing sensor units do not necessarily have to be arranged linearly. In other words, two opposing sensor units may be arranged at positions that are slightly deviated from positions perfectly opposing each other.

According to each of the embodiments described above, it is possible to reduce an erroneous detection that is generated when scan ranges of laser beams launched from a plurality of distance measuring apparatuses interfere with each other.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measuring apparatus that measures a distance to a measurement target from a plurality of directions, comprising:
    a first sensor unit including a first light source, and a first multi-segment light receiving element;
    a second sensor unit including a second light source, and a second multi-segment light receiving element,
    wherein the first and second sensor units are separated from each other and have identical two-dimensional scan type configurations that launch first and second laser beams emitted from the first and second light sources, respectively, and receive reflected light from the measurement target by the first and second multi-segment light receiving elements, respectively; and
    a processor configured to integrate range images from the first and second sensor units,
    wherein the processor performs a process including
        specifying at least one light receiving part of the first multi-segment light receiving element of the first sensor unit, that receives the second laser beam launched from the second sensor unit in a state in which the measurement target is non-detectable by the first sensor unit;
        adjusting a phase in a vertical scan direction of the second laser beam launched from the second sensor unit with respect to a phase in the vertical scan direction of the first laser beam launched from the first sensor unit, until the at least one light receiving part of the first multi-segment light receiving element of the first sensor unit no longer receives the second laser beam launched from the second sensor unit; and
        integrating the range images from the first and second sensor units after the phase in the vertical scan direction of the second laser beam launched from the second sensor unit is adjusted.

2. The distance measuring apparatus as claimed in claim 1, wherein an adjusting amount of the phase by the adjusting is ½ a maximum vertical scan period or less within one frame in which the second laser beam performs a raster scan in a horizontal scan direction and the vertical scan direction.

3. The distance measuring apparatus as claimed in claim 1, wherein the specifying specifies the at least one light receiving part of the first multi-segment light receiving element of the first sensor unit for every one horizontal scan within one frame in which the second laser beam performs a raster scan in a horizontal scan direction and the vertical scan direction.

4. The distance measuring apparatus as claimed in claim 1, wherein the first and second sensor units are provided at positions opposing each other via the measurement target.

5. The distance measuring apparatus as claimed in claim 4, wherein the first and second sensor units form a sensor pair, and further comprising:
    a plurality of sensor pairs provided at a plurality of locations, respectively.

6. The distance measuring apparatus as claimed in claim 1, wherein the range images include
    a first range image from the first sensor unit, that is a depth map in which distance values at each of distance measurement points are arranged in an order of raster scanned samples scanned by the first sensor unit, and
    a second range image from the second sensor unit, that is a depth map in which distance values at each of distance measurement points are arranged in an order of raster scanned samples scanned by the second sensor unit.

7. The distance measuring apparatus as claimed in claim 1, wherein
    the first sensor unit comprises
        a first launch unit including the first light source, a first biaxial scan mirror, and a first projection lens, wherein the first launch unit is configured to perform a raster scan by the first laser beam emitted from the first light source and deflected by the first biaxial scan mirror, via the first projection lens, and
        a first reception unit including a first reception lens, the first multi-segment light receiving element, and a first circuit configured to output a first range image based on a signal that is output from the first multi-segment light receiving element in response to receiving the reflected light from the measurement target via the first reception lens, and the second sensor unit comprises
- a second launch unit including the second light source, a second biaxial scan mirror, and a second projection lens, wherein the second launch unit is configured to perform a raster scan by the second laser beam emitted from the second light source and deflected by the second biaxial scan mirror, via the second projection lens, and
- a second reception unit including a second reception lens, the second multi-segment light receiving element, and a second circuit configured to output a second range image based on a signal that is output from the second multi-segment light receiving element in response to receiving the reflected light from the measurement target via the second reception lens.

8. A distance measuring method that measures a distance to a measurement target from a plurality of directions, comprising:
- launching, from first and second sensor units having identical two-dimensional scan type configurations, a first laser beam emitted from a first laser light source of the first sensor unit and a second laser beam emitted from a second laser light source of the second sensor unit, and receiving, by a first multi-segment light receiving element of the first sensor unit and a second multi-segment light receiving element of the second sensor unit, reflected light from the measurement target by the first and second multi-segment light receiving elements, respectively;
- specifying, by a processor, at least one light receiving part of the first multi-segment light receiving element of the first sensor unit, that receives the second laser beam launched from the second sensor unit in a state in which the measurement target is non-detectable by the first sensor unit;
- adjusting, by the processor, a phase in a vertical scan direction of the second laser beam launched from the second sensor unit with respect to a phase in the vertical scan direction of the first laser beam launched from the first sensor unit, until the at least one light receiving part of the first multi-segment light receiving element of the first sensor unit no longer receives the second laser beam launched from the second sensor unit; and
- integrating, by the processor, range images from the first and second sensor units after the phase in the vertical scan direction of the second laser beam launched from the second sensor unit is adjusted.

9. The distance measuring method as claimed in claim 8, wherein an adjusting amount of the phase by the adjusting is ½ a maximum vertical scan period or less within one frame in which the second laser beam performs a raster scan in a horizontal scan direction and the vertical scan direction.

10. The distance measuring method as claimed in claim 8, wherein the specifying specifies the at least one light receiving part of the first multi-segment light receiving element of the first sensor unit for every one horizontal scan within one frame in which the second laser beam performs a raster scan in a horizontal scan direction and the vertical scan direction.

11. The distance measuring method as claimed in claim 8, wherein the launching launches the first and second laser beams from the first and second sensor units that are provided at positions opposing each other via the measurement target.

12. The distance measuring method as claimed in claim 11, wherein
- the launching launches the first and second laser beams from the first and second sensor units that form a sensor pair, and
- the launching includes launching the first and second laser beams from the first and second sensor units forming each of a plurality of sensor pairs provided at a plurality of locations, respectively.

13. The distance measuring method as claimed in claim 8, wherein the range images include
- a first range image from the first sensor unit, that is a depth map in which distance values at each of distance measurement points are arranged in an order of raster scanned samples scanned by the first sensor unit, and
- a second range image from the second sensor unit, that is a depth map in which distance values at each of distance measurement points are arranged in an order of raster scanned samples scanned by the second sensor unit.

14. A non-transitory computer-readable storage medium having stored therein a program for causing a computer to perform a process comprising:
- launching, from first and second sensor units having identical two-dimensional scan type configurations, a first laser beam emitted from a first laser light source of the first sensor unit and a second laser beam emitted from a second laser light source of the second sensor unit, and receiving, by a first multi-segment light receiving element of the first sensor unit and a second multi-segment light receiving element of the second sensor unit, reflected light from the measurement target by the first and second multi-segment light receiving elements, respectively;
- specifying at least one light receiving part of the first multi-segment light receiving element of the first sensor unit, that receives the second laser beam launched from the second sensor unit in a state in which the measurement target is non-detectable by the first sensor unit;
- adjusting a phase in a vertical scan direction of the second laser beam launched from the second sensor unit with respect to a phase in the vertical scan direction of the first laser beam launched from the first sensor unit, until the at least one light receiving part of the first multi-segment light receiving element of the first sensor unit no longer receives the second laser beam launched from the second sensor unit; and
- integrating range images from the first and second sensor units after the phase in the vertical scan direction of the second laser beam launched from the second sensor unit is adjusted.

15. The non-transitory computer-readable storage medium as claimed in claim 14, wherein an adjusting amount of the phase by the adjusting is ½ a maximum vertical scan period or less within one frame in which the second laser beam performs a raster scan in a horizontal scan direction and the vertical scan direction.

16. The non-transitory computer-readable storage medium as claimed in claim 14, wherein the specifying specifies the at least one light receiving part of the first multi-segment light receiving element of the first sensor unit for every one horizontal scan within one frame in which the second laser beam performs a raster scan in a horizontal scan direction and the vertical scan direction.

17. The non-transitory computer-readable storage medium as claimed in claim 14, wherein the launching launches the first and second laser beams from the first and second sensor units that are provided at positions opposing each other via the measurement target.

18. The non-transitory computer-readable storage medium as claimed in claim 17, wherein
- the launching launches the first and second laser beams from the first and second sensor units that form a sensor pair, and
- the launching includes launching the first and second laser beams from the first and second sensor units forming each of a plurality of sensor pairs provided at a plurality of locations, respectively.

19. The non-transitory computer-readable storage medium as claimed in claim 14, wherein the range images include
- a first range image from the first sensor unit, that is a depth map in which distance values at each of distance measurement points are arranged in an order of raster scanned samples scanned by the first sensor unit, and
- a second range image from the second sensor unit, that is a depth map in which distance values at each of distance measurement points are arranged in an order of raster scanned samples scanned by the second sensor unit.

\* \* \* \* \*